United States Patent [19]

Boumans et al.

[11] Patent Number: 4,823,685
[45] Date of Patent: Apr. 25, 1989

[54] APPARATUS FOR PREPARING HOT DRINKS

[76] Inventors: Peter M. Boumans, De Bongerd 7, 6151 Br Munstergeleen; Hendrik J. J. Sobczak, Achter de Kerk 7, 6365 Schinnen, both of Netherlands

[21] Appl. No.: 49,428

[22] Filed: May 14, 1987

Related U.S. Application Data

[63] Continuation-in-part of Ser. No. 948,342, filed as PCT EP86/00193 on Mar. 28, 1986, published as WO86/05670 on Oct. 9, 1986.

[30] Foreign Application Priority Data

Mar. 28, 1985 [NL] Netherlands .......................... 8500925

[51] Int. Cl.⁴ ............................................. A47J 31/00
[52] U.S. Cl. ...................................... 99/287; 99/323.1
[58] Field of Search ...................... 99/279, 287, 323.1, 99/283, 280, 275; 426/433

[56] References Cited

U.S. PATENT DOCUMENTS

| | | |
|---|---|---|
| 3,552,976 | 1/1971 | King . |
| 3,565,641 | 2/1971 | King ........................ 99/287 |
| 3,666,558 | 5/1972 | Pryor et al. .................. 134/1 |
| 4,632,023 | 12/1986 | King ........................ 99/287 |

FOREIGN PATENT DOCUMENTS

| | | |
|---|---|---|
| 2432141 | 1/1976 | Fed. Rep. of Germany . |
| 931540 | 2/1948 | France . |
| 1565033 | 4/1969 | France . |
| 2067808 | 8/1971 | France . |

*Primary Examiner*—Robert W. Jenkins
*Attorney, Agent, or Firm*—Vorys, Sater, Seymour and Pease

[57] ABSTRACT

An apparatus for making coffee or other hot drinks from finely divided material and hot water including a space for receiving the water and the material, a filter and a discharge conduit positioned below the filter. A source of gas under pressure is connected to the discharge conduit such that during a selected time the mixture of water and material inside the space can be agitated from below in counterflow to the natural flow of the extract.

8 Claims, 1 Drawing Sheet

APPARATUS FOR PREPARING HOT DRINKS

BACKGROUND OF THE INVENTION

This is a continuation-in-part of U.S. application Ser. No. 948,342, filed as PCT EP86/00193 on Mar. 28, 1986, published as WO86/05670 on Oct. 9, 1986, whose contents are hereby incorporated by reference in their entirety.

The present invention relates to apparatuses for preparing drinks, such as hot coffee, with hot liquid, such as water, and a ground or finely divided material or from a crumbly, leafy or pulvery substance, including a space for receiving the material or substance and hot liquid, a filter, a discharge conduit below the filter and means for feeding a quantity of air through the filter and the mixture of liquid and the material or substance.

An apparatus of this type is disclosed in U.S. Pat. No. 3,552,976, which shows an apparatus having a cylinder and piston space below its filter and within which a piston is moved up and down by means of a crank shaft. During the upward movement the piston presses a predetermined and non-variable quantity of air upwardly through the filter and through the mixture of water and material or substance and agitates this mixture of water and material thereby improving the quality of the resulting hot drink.

That known apparatus, however, does not provide for any adjustment by the user and has the further disadvantage that the flow of air depends on the velocity of the piston which piston, starting from its lower point of return, starts with an increasing speed, has its highest speed halfway through its stroke and then decelerates. The speed of the air through the filter is critical. If the speed is too high then the air below the filter primarily is compressed and subsequently is forced through the filter. If the speed is too low the agitation is insufficient. The piston generates a pulse of air through the mixture of water and material, beginning slowly and quickly, too quickly, forcing a large air bubble through the mixture. In other words, the agitation of the mixture during the stroke of the piston is only of short duration during which the agitation is in conformity with a type and quality of the material from which the drink is made and does not allow any adaptation of the drink to the taste of the individual user. The short period of high speed of the air volume through the filter and mixture also tends to loosen the thick sediment of the material on the lower surface of the filter in a manner which cannot be controlled and which can cause undesirable substances from the material to affect the taste of the drink.

A continuous steady gentle flow of air bubbles is desirable but cannot be obtained with this known apparatus. Further, this apparatus due to its fixed air volume and predetermined fixed quantities of the material from which the drink has to be made also cannot be adapted to other substances, even to other qualities of coffee which require different extraction times.

It is known to agitate the mixture of water and material by feeding air into the space from above by means of a conduit connected to an air pump which conduit has its lower end at a distance above the bottom of the space receiving the mixture. Examples of such are found in French patent specification No. 1,565,033 and in German published application No. 2,432,141. This type of agitation, however, has the disadvantage in that it only agitates the immediate environment of the outlet opening of the air tube and leaves unagitated or unevenly agitated the surrounding areas in particular the areas below the outlet opening and the side walls which normally form or support the filter.

OBJECTS AND SUMMARY OF THE INVENTION

Accordingly, an object of the invention is to provide an apparatus which in a very simple way properly agitates the entire contents in a manner such that during the time of agitation the agitation is of constant intensity, the entire contents are agitated, undesired materials are not loosened and the agitation can be adjusted to the type of beverage material, the desired degree of dissolving action by the hot water and the individual taste of the consumer.

A further object of the invention is to provide a means for simply modifying existing apparatuses to have the above-mentioned advantages.

According to the invention these objects are achieved by connecting the discharge conduit between the filter and outlet to a source of gas under pressure which is provided with adjustable means for controlling the operation time of the source, and with a control valve between the outlet of the discharge conduit and the point of connection of the source to the discharge conduit. By connecting a source of gas under pressure directly to the discharge conduit and by providing a valve for closing the outlet during the time period that gas has to be fed through the filter to agitate the mixture, not only is a simple solution obtained which requires only a small investment and can be added to existing drink making machines, but also the flow of gas, preferably air, is a constant flow measured in volume per unit time so that the mixture is agitated with the same intensity throughout its mass and through the full agitation period.

Moreover the time period is adjustable by simple means such as a manually operated switch or a time clock. The pressure of the gas can be adjustable as well but it will be understood that a very low pressure is sufficient because only a small agitation is required. Preferably the source of gas under pressure comprises an electric air pump, which can be the type of air pump as used for example in aquariums. Such an air pump delivers a quiet steady flow of air during the time period the pump is operating. This quantity of air per time unit can in that case not be changed but the time period itself can be adjusted to adapt the drink to the user's individual taste, which is particularly important for coffee.

According to the invention it is preferred that a non-return valve be arranged between the source of pressurized gas and the point of connection to prevent fluid flow in the direction towards the source. This avoids fouling of the pump with particles present in the drink.

The valve between the outlet of the discharge conduit and the point of connection preferably is a membrane valve which by means of a small membrane area controls the flow through the discharge conduit and which by means of a larger surface at its opposite side is exposed to the pressure of a source of gas under pressure. This has the effect that during agitation, i.e. during functioning of the source of pressure or operation of the pump, the discharge conduit is automatically closed whereas during discharge of the hot drink the valve opens. Moreover the valve can easily be cleaned when needed. Such a membrane valve has been constructed in a known manner such that the membrane is held in place by a removable cap. Preferably the connection of the source of gas under pressure with the membrane valve is provided with a pressure relief valve, in particular a solenoid-operated pressure relief valve, so that it is possible to move the valve in the open position as soon as the pump is deenergized so that at the same time the pressure above the membrane of the membrane valve is relieved and the drink can be discharged. It moreover is possible according to the invention to use two separate pumps, one for agitating the coffee and the other for operating the membrane valve.

Other objects and advantages of the present invention will become apparent to those persons having ordinary skill in the art to which the present invention pertains from the following description taken in conjunction with the accompanying drawings.

DETAILED DESCRIPTION OF THE PREFERRED EMBODIMENTS

Figure 1:
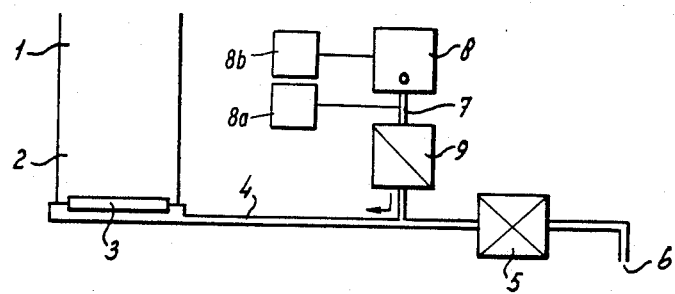
FIG. 1 is a schematical view of an apparatus for preparing hot drinks of the present invention.

Referring to the drawings, the brewer 1 of a coffee making machine is equipped at its bottom portion 2 with a coffee filter 3 through which the coffee extract can be discharged via the pipe 4 and a valve 5, such as a solenoid-operated valve, to the discharge pipe 6. The pipe 4 in front of the valve 5 is connected to a separate pipe 7 with an air pump 8 and a back pressure valve 9. The pressures in the pipe 7 and in the discharge pipe are adjusted by means of the valves 5 and 9 so that when operating the air pump 8, air or another suitable agitating gas, is forced through the pipes 7 and 4 into the lower portion of the brewer compartment 2 in a direction opposite to the direction of the discharge of the coffee extract through the filter element 3. Preferably when the air is forced into the brewer it is being evenly distributed over the entire filter area below the coffee and hot water mixture inside the brewer 1.

By feeding air from the pipe 7 through pipe 4 into the brewer 1 by means of pump 8 the coffee mixture is agitated for a predetermined period of time at a constant agitation rate. This markedly increases the degree of extraction of the coffee reducing the amount of coffee used which results in significant cost savings. Other advantages include:

(A) The degree of extraction of the coffee can be adjusted by the user without changing the quantity of the ground coffee by simple adjusting the degree and/or time of the agitation. The taste of the coffee drink can be individually adjusted without changing the amount of ground coffee and/or the quantity of water and/or the time of brewing. The degree of extraction depends on the degree of extracting taste substances from the ground coffee.

(B) Due to the agitation of the mixture in the brewer 1 lighter and smaller ground coffee particles move into the upper region of the brewer compartment resulting in less sediment in the coffee cup.

(C) Because of the continuous flow of forced air blown upwardly through the filter 3, the filter element clogs less frequently.

The speed and volume of the air flow into the brewer define the time and degree of the agitation. Accordingly the present invention allows the degree of turbulence of the coffee mixture to be controlled with the result that the user can adjust the desired taste of the coffee delivered by discharge pipe 6.

The time of operation of pump 8 lies between a minimum period of time with a minimum degree of agitation and a maximum duration of time with a maximum degree of agitation without any need to change the quantity of coffee normally used in a coffee making machine. The back pressure or non-return valve 9 in the pipe 7 prevents a flow of coffee extract into this pipe when no air is being forced into the brewer 2 by pump 8, and thereby prevents the fouling of the interior of air pump 8.

Coffee making machines according to the invention with predetermined agitation improve the coffee taste and allow for the adaptation to the taste of each individual user. Moreover it is possible to use rather slowly extracting coffee ground beans whose aroma is preferred. In the known coffee making machines fast extracting coffee has to be used, which has the disadvantage that the coffee extract obtained from this coffee bean often has a bitter taste which is not appreciated by most coffee drinkers.

It is further noted that the forced air agitation in the subject coffee making apparatus can be adjusted from zero to its maximum by means of a knob 8a with a circumferential scale indicator to control the air quantity in pipe 7 per unit of time and by using a time switch 8b for the duration of the operation of the air pump 8.

Figure 2:
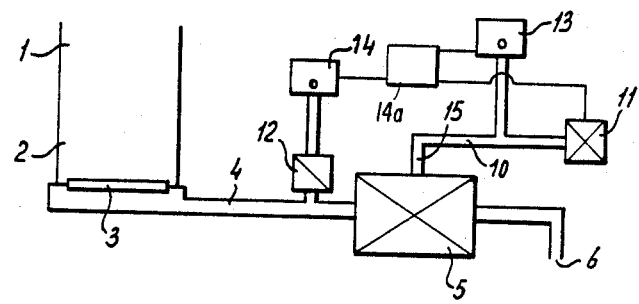
FIG. 2 is a schematical view of another apparatus for preparing hot drinks of the present invention.
Figure 3:
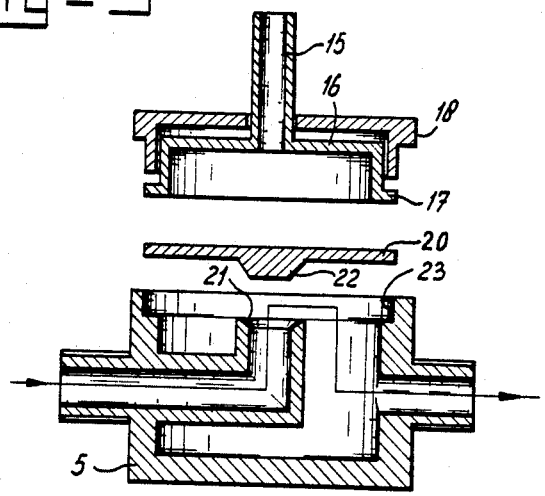
FIG. 3 is a transverse sectional view of a control valve of the apparatus of FIG. 2.

FIGS. 2 and 3 show a preferred embodiment of the coffee making machine according to the invention. The construction of control valve 5 used in the embodiment of FIG. 2 is shown in greater detail and in cross section in FIG. 3. The valve 5 has a membrane 20 with a small lower valve portion 22 cooperating with valve seat 21 in the flow path from pipe 4 towards discharge pipe 6. Membrane 20 is placed in recess 23 of the valve housing and held in place by the flange 17 of a cup-shaped element 16 and a removable clamping cover 18. The cup-shaped element 16 has a tube 15 connected to a pipe 10. The pipe 10 is connected to an air pump 13 and has a solenoid valve 11. A second pump 14 with non-return valve 12 is connected to the pipe 4. When air has to be fed into the brewer 1 the valve 11 closes by means of the same switch 14a which starts the pumps 13 and 14. The air delivered by the pump 13 has only a slight pressure which is sufficient however to move the membrane 20 into its closing position with the valve portion 22 upon seat 21. This is possible because the upper surface of the membrane is considerably larger than the surface of valve portion 22. Pump 14 ensures that air flows through the non return valve 12 into the pipe 4 and hence into the brewer. After agitation the pumps 13 and 14 stop, valve 11 opens and the pressure on top of membrane 20 is released. Coffee can then flow through pipe 4, open valve 5 and pipe 6. Valve 12 prevents fouling of the pump 4. Valve 5 is constructed so that is can be easily cleaned.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the following claims.

What is claimed is:

1. An apparatus for preparing hot drinks from a beverage material and a liquid comprising:

a container for receiving the material and the liquid, a filter positioned so that the brewed hot liquid from said container can pass therethrough, a discharge conduit positioned generally below said filter and having a discharge outlet, a forcing means for forcing a continuous steady flow of gas into said discharge conduit up through said filter and into said container to agitate the material and liquid therein, said forcing means being connected to said discharge conduit at a connection point, a controlling means for adjustably controlling the operation time of said forcing means, and a control valving positioned between said discharge outlet and said connection point.

2. The apparatus of claim 1 wherein said forcing means comprises an electric air pump.

3. The apparatus of claim 1 wherein said forcing means distributes the forced gas evenly over the surface of said filter.

4. The apparatus of claim 1 further comprising a nonreturn valving means positioned between said forcing means and said point of connection for preventing fluid flow towards said forcing means.

5. The apparatus of claim 1 wherein said control valve is a membrane valve including a membrane having a first membrane area on one side controlling the flow through said discharge conduit and a second membrane area on the other side, larger than said first membrane area and exposed to the pressure of a pressurized gas.

6. The apparatus of claim 5 further comprising a pressure relief valve between said membrane valve and the source of said pressurized gas.

7. The apparatus of claim 5 further comprising a pressurized gas source for operating said membrane valve which is separate from said forcing means.

8. The apparatus of claim 1 wherein said beverage material is coffee and said liquid is hot water.

* * * * *